United States Patent
Ryan (10) Patent No.: US 8,838,399 B2
(45) Date of Patent: Sep. 16, 2014

(54) METHOD FOR ESTIMATING THE LOCATION OF A LEAK IN A PIPELINE

(75) Inventor: Nicholas John Ryan, Aberdeenshire (GB)

(73) Assignee: Seal-Tite, LLC., Madisonville, LA (US)

( * ) Notice: Subject to any disclaimer, the term of this patent is extended or adjusted under 35 U.S.C. 154(b) by 630 days.

(21) Appl. No.: 13/133,815

(22) PCT Filed: Dec. 11, 2009

(86) PCT No.: PCT/GB2009/051699
§ 371 (c)(1),
(2), (4) Date: Aug. 17, 2011

(87) PCT Pub. No.: WO2010/067128
PCT Pub. Date: Jun. 17, 2010

(65) Prior Publication Data
US 2011/0295527 A1    Dec. 1, 2011

(30) Foreign Application Priority Data
Dec. 11, 2008   (GB) .................................. 0822598.9

(51) Int. Cl.
*G01M 3/28*   (2006.01)
*G01M 3/18*   (2006.01)
*G01M 3/24*   (2006.01)

(52) U.S. Cl.
CPC .......... *G01M 3/2807* (2013.01); *G01M 3/2892* (2013.01); *G01M 3/18* (2013.01); *G01M 3/243* (2013.01)
USPC ................... 702/51; 702/45; 702/50; 702/100

(58) Field of Classification Search
CPC ..... G01M 3/18; G01M 3/243; G01M 3/2807; G01M 3/2892
USPC .......................... 702/45, 50, 51, 100
See application file for complete search history.

(56) References Cited

U.S. PATENT DOCUMENTS

| | | | | |
|---|---|---|---|---|
| 3,690,150 A * | 9/1972 | Mullen | ...................... | 73/40.5 R |
| 4,280,356 A * | 7/1981 | Stewart | ...................... | 73/40.5 R |
| 4,308,746 A * | 1/1982 | Covington | ................ | 73/40.5 R |
| 4,384,475 A * | 5/1983 | Burgess et al. | ........... | 73/40.5 R |
| 4,394,351 A * | 7/1983 | Gast | ............................. | 422/171 |
| 4,450,711 A * | 5/1984 | Claude | ...................... | 73/40.5 R |
| 4,640,121 A * | 2/1987 | Leuker et al. | .............. | 73/40.5 A |
| 5,719,785 A * | 2/1998 | Standifer | ........................ | 702/51 |
| 6,585,063 B2 * | 7/2003 | Larsen | ............................ | 175/57 |
| 6,912,472 B2 * | 6/2005 | Mizushina et al. | ............ | 702/51 |
| 6,993,963 B1 * | 2/2006 | Gudmundsson | ........... | 73/152.52 |
| 2002/0112889 A1 * | 8/2002 | Larsen | ............................ | 175/57 |
| 2010/0191481 A1 * | 7/2010 | Steven | ............................ | 702/47 |

* cited by examiner

*Primary Examiner* — Sujoy Kundu
*Assistant Examiner* — Paul D Lee
(74) *Attorney, Agent, or Firm* — Baker & Hostetler LLP (57) ABSTRACT

A method for estimating a location of a leak (x) in a pipe (1). A liquid of a known density is fed into the pipe at a first inlet pressure ($P_1$). When the liquid achieves a substantially steady flow rate, the flow rate passing into the pipeline is recorded. This step is repeated at a second, different, inlet pressure ($P_2$). Using this data, an estimate of the leak location (x) and the area of the leak is calculated by simultaneously solving an expression which is based on relating the frictional energy losses of the liquid travelling through the pipeline (1) to the pressure in the pipeline at the leak ($P_{leak}$) and the flow rate of liquid from the leak.

10 Claims, 6 Drawing Sheets

METHOD FOR ESTIMATING THE LOCATION OF A LEAK IN A PIPELINE

CROSS-REFERENCE TO RELATED APPLICATIONS

This application is the National Stage of International Application No. PCT/GB2009/051699, filed Dec. 11, 2009, which claims the benefit of GB Application No. 0822598.9, filed Dec. 11, 2008, the disclosures of which are incorporated herein by reference in their entireties.

The present invention relates to a method for estimating the location of a leak in a pipeline, and in particular, a method for use in large scale liquid pipelines such as land-based pipelines and umbilical sub-sea pipelines.

In this connection, pipelines are used extensively in various industries to carry liquids such as water, oil, gas, hydraulic fluid, and MEG. This is especially true for industries involved in energy production and distribution, such as the oil and gas industries. In such cases, pipelines can be extremely long, with lengths of over 100 km being common. In addition, such pipelines may be submerged on the seabed, so-called sub-sea pipelines.

Over time, it is common for leaks to form in pipelines due to various factors, such as corrosion, manufacturing defects or mechanical damage. However, due to the length of such pipelines, once a leak has formed it can often be difficult to locate it in order to perform repairs. This problem is exacerbated in the case of sub-sea or buried pipelines because manual inspection, particularly over large distances, becomes extremely difficult or impossible.

To address this problem, various methods have been proposed for locating leaks in pipelines. For example, in one method, radioactive tracer elements are introduced into the pipeline liquid upstream of the leak. In this way, tracer elements will be expelled from the leak and can thereby be detected by a remotely operated vehicle or similar detector. However, whilst such a method can be effective, it still requires a detector to be transported along the entire length of the pipeline, which can be expensive and time consuming, particularly in the case of long pipelines.

Furthermore, in the case of umbilical pipelines, which comprise number of smaller pipelines carried within a sheath, it can be very difficult to identify the location of a leak because of the tight packing of the pipes and the sheath surrounding them.

Accordingly, the present invention seeks to address the above problems and provide a method of locating leak in a pipeline.

According to the present invention there is provided a method for estimating a location of a leak in a pipe, the method comprising the steps of:—

A) feeding a liquid of a known density into said pipe at a first inlet pressure;

B) when said liquid achieves a substantially steady flow rate at said first pressure, recording the flow rate of the liquid passing into the pipeline;

C) repeating steps A and B at a second, different, inlet pressure; and

D) calculating an estimate of the leak location and the area of the leak by simultaneously solving an expression of the leak location relative to the flow rate recorded for said first and second inlet pressures, wherein said expression comprises estimating the leak location and the area of the leak based on frictional energy losses of said liquid travelling through the pipeline to the leak location and relating this to the pressure in the pipeline at the leak and the flow rate of liquid from said leak.

In this way, an estimate can be made as to the location of the leak (i.e. the distance along the pipeline at which the leak is located) based on measurements that can be taken remote from the location of the leak. That is, measurements of the liquid pressure and flow rate, or liquid velocity (as Flow rate=velocity×pipeline area), taken at the inlet (or the inlet and outlet) of the pipeline, for example, can be used to locate a leak. Therefore, this can reduce the time and expense taken to manually locate the leak, which can offer considerable advantages in situations where it is extremely difficult to locate leaks. For example, in a long sub-sea pipeline, underwater pressures and lack of visibility can make it very expensive to perform sub-sea investigations and repairs. In such a case, the present invention can greatly reduce the distance over which a repair team must search for a leak, helping them to locate the leak more quickly, thereby reducing costs, liquid wastage, and potential environmental damage. Furthermore, the method also allows an estimate to be made of the size of the leak. This is important because the size of the leak will often have a bearing on the equipment and personnel required to repair the leak. Consequently, the present invention provides an advance indication of the size of the leak which can help to ensure the appropriate response is taken. For example, the leak size estimate can be used to ensure that the repair team is properly equipped before they undertake any sub-sea exploration to complete the repairs.

Conveniently, said expression applies the D'Arcy Weisbach relationship for estimating said frictional energy losses.

Conveniently, said expression applies Bernoulli's Equation for relating frictional energy losses to the pressure in the pipeline at the leak location.

Conveniently, said expression applies the Orifice Flow Equation for relating the pressure in the pipeline at the leak location to the flow rate.

Conveniently, said expression further comprises accounting for external pressure at the leak location on the flow rate of liquid from said leak. In this way, the effect of the pipeline being sub-sea can be accounted for. As such, the present invention can be used to accurately locate leaks in sub-sea pipelines, which otherwise could be especially difficult and expensive.

Conveniently, in steps B and C, said liquid achieves a substantially steady flow rate when there is less than a +/−20% change in flow rate.

Preferably, said steps B and C, said pressure and flow rate are sampled over a period of 30 to 60 minutes and an average pressure and flow rate value is recorded. In this way, the effect of minor fluctuations in pressure or flow rate can be minimised by averaging the recorded values.

In one embodiment, said method further comprises repeating steps C at further, different, inlet pressures; calculating further estimates of the leak location using the flow rates recorded for said further inlet pressures; and averaging said estimates. In this way, a more accurate estimate of the location of the leak can be obtained.

In one embodiment, the method step A further comprises shutting said pipeline downstream of said leak, such that, once said liquid achieves a substantially steady flow rate, the flow rate of liquid passing into the pipeline can be assumed to be equal to the flow of liquid from the leak. In such a way, a simplified expression can be applied to calculate leak location.

Conveniently, said expression is represented by:

$$Q_L = C_d A_L \sqrt{2g\left[\frac{P_1}{\rho_m g} + \left(\frac{\rho_m - \rho_w}{\rho_m}\right)D - \lambda\left(\frac{x}{d}\right)\left(\frac{V^2}{2g}\right)\right]}$$

where
- $Q_L$ is the flow of liquid through the pipeline measured at the inlet;
- $C_d$ is the coefficient of discharge;
- $A_L$ is the area of the leak;
- g is gravitational acceleration;
- $P_1$ is the pressure at the pipeline inlet;
- $\rho_m$ is the liquid density in pipeline;
- $\rho_w$ is the density of seawater;
- D is the depth beneath the sea at the leak location;
- λ is the friction factor along the line;
- x is the leak location;
- d is the pipeline diameter;
- V is the liquid velocity.

In an alternative embodiment, method step B further comprises recording the pressure and flow rate of the liquid at a location downstream of the leak; and wherein said expression accounts for the flow of liquid downstream of the leak in calculating an estimate of the leak location by deducting the effect of frictional energy losses and pressure in the pipeline of the liquid travelling from the leak location to the downstream location. In this way, the present invention can be used with open ended pipelines, without requiring the pipeline to be closed. Therefore, distribution of liquid through the pipeline can be maintained and the leak located, simply by varying the pressure and taking measurements at the inlet and a position downstream of the leak, such as the pipeline outlet.

Conveniently, said expression is represented by:

$$A_L = \frac{1}{M} \cdot \left(V_1 \mp \sqrt{N}\right)$$

where $$M = C_d \cdot \frac{1}{A} \sqrt{\frac{2}{\rho} \cdot (P_1 + g \cdot \rho \cdot (z_1 - z_*) - g \cdot \rho \cdot \Delta H_{1 \to *} - P_{ext})}$$

$$N = 2 \cdot g \left[\frac{P_1}{\rho \cdot g} - \frac{P_{out}}{\rho \cdot g} + z_1 - z_{out} + \frac{V_1^2}{2 \cdot g} - \Delta H_{1 \to out}\right]$$

$$\Delta H_{1 \to *} = \lambda \left(\frac{x}{d}\right)\left(\frac{V_1^2}{2 \cdot g}\right)$$

$$\Delta H_{1 \to out} = \lambda \left(\frac{x}{d}\right)\left(\frac{V_1^2}{2 \cdot g}\right) + \lambda \left(\frac{(L-x)}{d}\right)\left(\frac{V_{out}^2}{2 \cdot g}\right)$$

where:
- $A_L$ is the area of the leak;
- $V_1$ is the inlet liquid velocity;
- $V_{out}$ is the liquid velocity at the downstream location;
- g is gravitational acceleration;
- $P_1$ is the pressure at the pipeline inlet;
- $P_{out}$ is the pressure at the downstream location;
- ρ is the liquid density in pipeline;
- $Z_1$ is the static head at the inlet;
- $Z_{out}$ is the static head at the downstream location;
- $Z_*$ is the static head at the leak location;
- $\Delta H_{1-*}$, is liquid energy loss between the inlet and the leak location;
- $\Delta H_{1-out}$ is liquid energy loss between the inlet and the outlet;
- $C_d$ is the coefficient of discharge;
- A is the cross sectional area of the pipeline;
- $P_{ext}$ is the external pressure at the leak location;
- x is the leak location;
- L is the length of the pipeline between the inlet and the downstream location;
- d is the pipeline diameter; and
- λ is the friction factor along the line.

Illustrative examples of the present invention will now be described with reference to the accompanying drawings, in which:—

FIG. 3 shows a graph of pressure variation over distance for pressures $P_1$ and $P_2$ in an example leaking pipeline having a closed end when (a) where the pipeline is flat and vents into ambient air; and (b) where the static pressure is varied due to changes in physical height (altitude) of the pipeline;

FIG. 6 shows a graph of pressure variation over distance for pressures $P_1$ and $P_2$ in an example leaking pipeline having an open end when (a) where the pipeline is flat and vents into ambient air; and (b) where the static pressure is varied due to changes in physical height (altitude) of the pipeline; and (c) when the pipeline is sub-sea and subject to the effect of topography and static head.

In this connection, the present invention provides a method by which the location and size of a leak in a pipeline can be estimated based on measurements taken at the end or ends of the pipeline. This is achieved by estimating the frictional effects of the liquid travelling through the pipeline and relating this to the flow rate of liquid through the pipeline, as will be discussed in further detail below.

Figure 1:
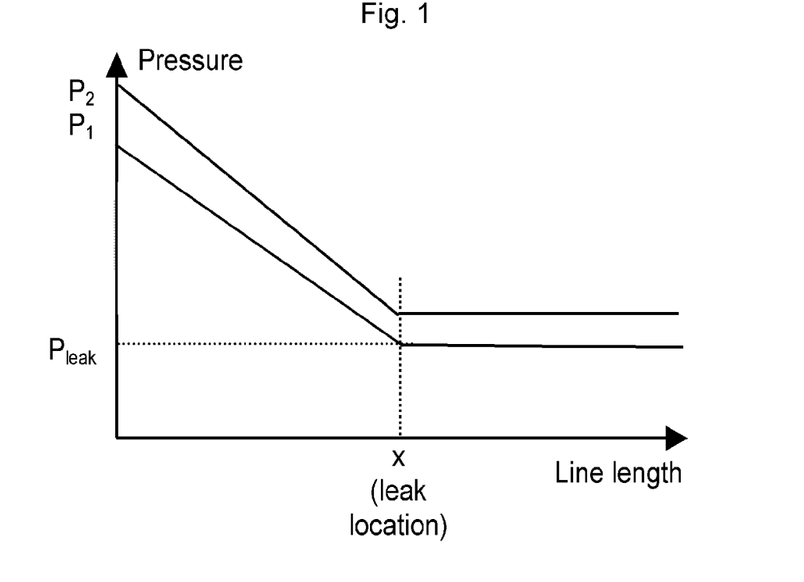
FIG. 1 shows schematic graph of pressure variation over distance for pressures $P_1$ and $P_2$ in a leaking pipeline having a closed end.

In this connection, FIG. 1 shows a schematic graph of liquid pressure variation over distance in an example leaking pipeline having a closed end. In order to provide a simplified expression, in this example, the pipeline has been closed (i.e. blocked) at a point downstream of the leak. Furthermore, in this example, the pipeline is flat and vents into ambient air, although the present invention is not limited to this.

As can be seen, when a substantially incompressible liquid is fed into the pipeline at pressure $P_1$, once the pipeline has reached a steady state, there is an associated flow $Q_1$ through the pipeline as liquid flows out of the leak at location X. It will be appreciate that this flow, $Q_1$, is dependant at least in part on the size of the leak $A_L$, as well as the internal pressure at the leak location which is, in turn, dependant on the inlet liquid pressure $P_1$.

Over the first upstream region, from the inlet to the leak location X, the pressure will gradually drop from pressure $P_1$ to $P_{leak}$. This pressure drop is due to frictional effects of the liquid passing though the pipeline. After the leak site, in the downstream region from the leak until the closed end of the pipeline, the pressure will remain constant as there is no further flow of liquid.

At a different pressure, $P_2$, the same pattern is observed. That is, when the liquid is introduced into the pipeline at pressure $P_2$, there is an associated flow $Q_2$ out of the leak. As such, the pressure gradually decreases in the upstream section of the pipeline until the leak site at distance X, after which the pressure is maintained a constant pressure.

From the above, a relationship can be seen between upstream pressure $P_1/P_2$ and flow $Q_1/Q_2$ through the pipeline to the unknown leak area $A_L$ and the leak location X (i.e. the length of the pipe from the inlet to the leak position). Accordingly, leak area $A_L$ and leak location X can be calculated by taking two stets of data measurements at different inlet pressures (e.g. $P_1$ and $P_2$) and using this data to simultaneously solve the expression of this relationship. The derivation of this expression is discussed in further detail below.

The flow of liquid through a leak can be calculated by the Orifice Equation:

$$Q_L = C_d A_L \sqrt{\frac{2\Delta P}{\rho_m}} \quad \text{Equation 1}$$

Where
  $Q_L$ is the flow through the leak;
  $C_d$ is the coefficient of discharge;
  $A_L$ is the area of the leak;
  $\Delta P$ is the pressure differential at the leak site; and
  $\rho_m$ is the density of the liquid in the pipeline.

As will be understood, $\rho_m$ is known from the type of liquid in the pipeline, $C_d$ can be determined as a function of Reynolds Number, $Q_L$ can be assumed to be equal to the upstream flow measurement. The unknown parameters in this equation are the area of the leak $A_L$ and the pressure differential at the leak site $\Delta P$.

The pressure differential $\Delta P$ at the leak site is given by Equation 2:

$$\Delta P = P_{in} - P_{ext} \quad \text{Equation 2}$$

Where $P_{in}$ is the pressure inside the pipeline at the leak;
  $P_{ext}$ is the pressure outside the pipeline at the leak.

If the pipeline is under water, for example on a sea bed, the pressure at the outside of the pipeline at the leak, $P_{ext}$ is related to the depth of water at the location, and is given by Equation 3:

$$P_{ext} = \rho_w g D \quad \text{Equation 3}$$

Where $\rho_a$ is the density of seawater;
  g is gravitational acceleration; and
  D is the depth at the leak location.

The internal pressure at the leak location, $P_{in}$, can be derived from the pipeline inlet pressure using Bernoulli's Equation, as shown in Equation 4:

$$\frac{P_1}{\rho_m g} + \frac{V_1^2}{2g} + Z_1 = \frac{P_{in}}{\rho_m g} + \frac{V_*^2}{2g} + Z_* + \Delta H_{1 \to *} \quad \text{Equation 4}$$

Where
  $Z_1$ is the static head at the inlet;
  $Z_*$ is the static head at the leak;
  $V_1$ is the liquid velocity at the inlet;
  $V_*$ is the liquid velocity at the leak;
  $P_1$ is the pressure inside the pipeline at the inlet;
  $P_{in}$ is the pressure inside the pipeline at the leak;
  $\rho_m$ is the liquid density;
  g is gravitational acceleration; and
  $\Delta H_{1 \to *}$ is liquid energy loss between the inlet and the leak.

The $\Delta H_{1 \to *}$ losses in this example can be attributed to friction and can be estimated using the D'Arcy Weisbach relationship as shown in Equation 5:

$$\Delta H_{1 \to *} = \lambda \left(\frac{x}{d}\right)\left(\frac{V^2}{2g}\right) \quad \text{Equation 5}$$

Where
  x is the length of the pipeline between the inlet to the leak;
  d is the diameter of the pipeline;
  V is the average velocity;
  g is gravitational acceleration; and
  $\lambda$ is the friction factor along the pipeline:
    In laminar situations:

$$\lambda = \frac{64}{Re}$$

In turbulent flow situations:

$$\frac{1}{\sqrt{\lambda}} = -2\log_{10}\left[\frac{\frac{\varepsilon}{D_h}}{3.7} + \frac{2.51}{Re\sqrt{\lambda}}\right]$$

where Re is the Reynolds Number.

Equation 5 can then be substituted into Equation 4. In this, it can be assumed $V_1 = V_*$ due to the continuity equation. That is, in any steady state process, the rate at which mass enters the system is equal to the rate at which it leaves the system, and hence for incompressible liquids the volume dilation rate must be zero. In this example it can also assumed that $Z_1 - Z_* = D$, as the difference in static head from the inlet to the leak can be attributed to any change in depth D at the leak location.

Accordingly, rearranging to obtain the pressure at the leak, $P_{in}$, gives equation 6:

$$P_{in} = \rho_m g \left[\frac{P_1}{\rho_m g} - \lambda\left(\frac{x}{d}\right)\left(\frac{V^2}{2g}\right) + D\right] \quad \text{Equation 6}$$

Then equation 6 and equation 3 can be substituted into Equation 2 to give Equation 7:

$$\Delta P = \rho_m g \left[\frac{P_1}{\rho_m g} - \lambda\left(\frac{x}{d}\right)\left(\frac{V^2}{2g}\right) + D\right] - \rho_w g D \quad \text{Equation 7}$$

Substituting Equation 7 into Equation 1 and rearranging gives Equation 8:

$$Q_L = C_d A_L \sqrt{2g\left[\frac{P_1}{\rho_m g} + \left(\frac{\rho_m - \rho_w}{\rho_m}\right)D - \lambda\left(\frac{x}{d}\right)\left(\frac{V^2}{2g}\right)\right]} \quad \text{Equation 8}$$

In a steady state condition, the flow at the leak is assumed to be equal to the flow at the inlet, hence $Q_L$ can be measured at the inlet. Gravitational acceleration g is known. The pressure at the inlet $P_1$ can be measured at the inlet. The coefficient of discharge $C_d$ can be determined as a function of Reynolds Number. The density of the liquid in the pipeline $\rho_m$ is know from the type of liquid being used as density is constant in an incompressible liquid. In the case of a sub-sea pipeline, the density of seawater $\rho_m$ is known and depth D can be estimated from topographical information for the pipeline. The friction factor $\lambda$ can be calculated from the equations listed above. The diameter of the pipeline d is known, and the velocity V can be measured at the inlet.

Accordingly, Equation 8 provides an expression of flow for pressure $P_1$ at the inlet, with the unknowns of the leak area $A_L$ and distance to the leak x. As mentioned above, by taking a second set of measurements at a different pressure $P_2$, Equation 8 can be solved simultaneously to derive estimated values for the leak location x and the leak area $A_L$.

Figure 2:
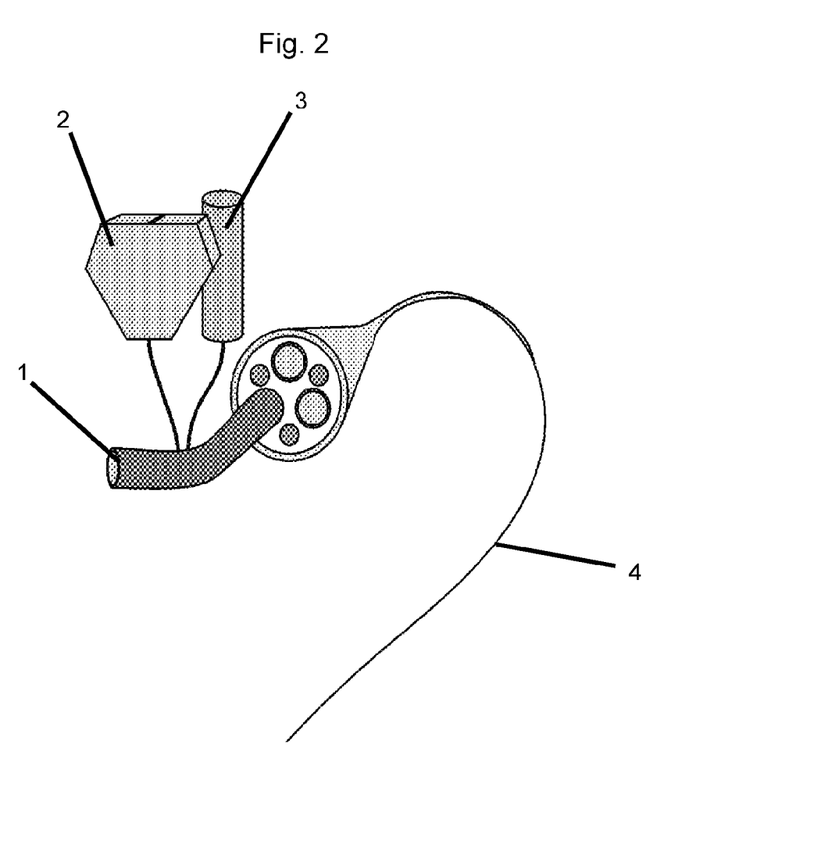
FIG. 2 shows a schematic of a long umbilical pipeline with measurement apparatus according to an embodiment of the present invention connected to the inlet of the pipeline.

FIG. 2 shows the testing apparatus of an embodiment of the present invention is used to detect the location of a leak in pipeline 1, which is part of a long umbilical pipeline 4. As can be seen, the umbilical is formed of a number of smaller pipelines wrapped in a sheath. In this example, pipeline 1 has been previously identified as likely to contain a leak because of a loss in pressure. A flow sensor 2 is connected for measuring the flow rate and velocity of liquid in the pipeline 1, and pressure sensor 3 is connected to measure the liquid pressure.

The first step in conducting the test is for the pipeline to be closed off at a known location downstream of the suspected leak. This can be achieved, for example, by closing a valve at the outlet of the pipeline.

Once closed, liquid is then pumped into the pipe inlet. In this example the liquid is MEG, although any substantially incompressible liquid of a known density could be used, e.g. water. In this respect, the liquid is fed into the pipeline at a first pressure, $P_1$, and is then allowed to stabilise and reach a steady state.

In this connection, stabilisation occurs once there is constant or substantially constant (e.g. +/−20%) flow rate for a given liquid pressure. Once the steady state has been reached, because the downstream end of the pipeline is closed, all upstream flow exits from the pipeline through the leak. Prior to this stabilisation, liquid is effectively stored in the pipeline under compression and hence the flow of liquid through the leak does not equal the flow entering the pipeline at the upstream end. The time needed to reach a steady state depends on a number of factors, including the pressure in the pipe. For instance, a stabilising time in the region of 5 hours may be required for a test pressure of bar. Other factors which affect the stabilising time include the length of the pipeline, as longer lines take longer to stabilise due to the storage of liquid under compression. In this example, the pipeline is 100 km long and therefore will require up to 10 hours to reach equilibrium and stabilise. As mentioned above, once the flow and pressure are observed to be stable, the flow through the leak may be assumed to equal the flow into the pipe upstream of the leak.

At this point, measurements of liquid pressure, velocity, flow rate are taken. This involves recording an average of measurements sampled for 30-60 minutes to ensure that the readings are stable. Thereafter, the liquid is fed into the pipeline at a second pressure $P_2$ and is then allowed to stabilise in the same way. Again, measurements of liquid pressure, velocity, and flow rate are taken.

In this connection, the inlet pressures are selected based on the system under test, such as the pipe diameter and pipe material. In this example, which is a standard umbilical pipeline, measurements are taken at pressures between 10 and 100 bar.

The above described measurement data, along with known specification and locational information concerning the pipeline can then be applied to simultaneously solve the expression set out in Equation 8 to calculate an estimated location of the leak x and its area $A_L$ (i.e. size). In this embodiment, these calculation steps are processed using a computer (not shown). Furthermore, although in the above example, only two sets of measurements at different pressures are taken, more than two sets may be used to improve the accuracy of the estimate. That is, in addition to calculations made based on pressures $P_1$ and $P_2$, calculations could also be made based on measurements taken at pressures $P_3$ and $P_4$, or more, and then averaged.

Figure 3A:
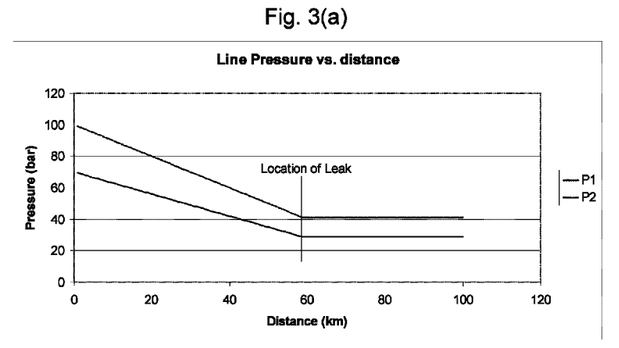
Figure 3B:
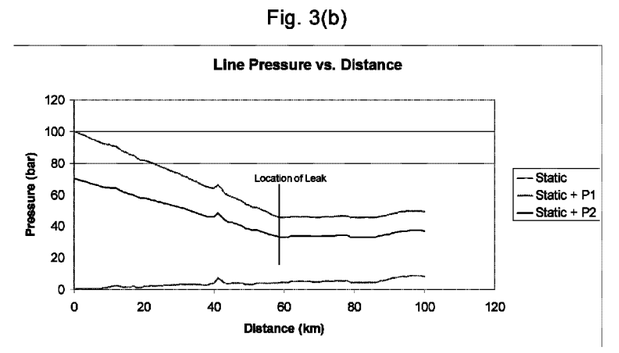
Figure 4A:
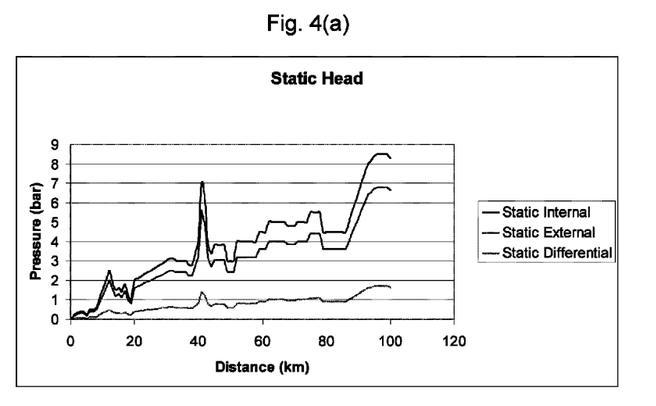
FIG. 4(a) shows a graph of the static head of an example sub-sea pipeline.
Figure 4B:
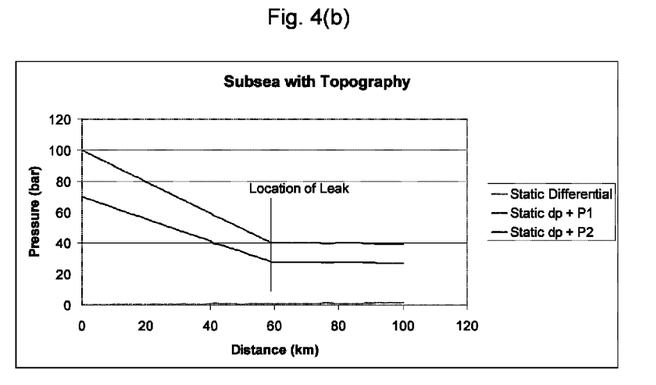
FIG. 4(b) shows a graph of pressure variation over distance for pressures $P_1$ and $P_2$ in the example leaking sub-sea pipeline having a closed end and subject to the effects of topography and static head.

In this connection, FIGS. 3 and 4 show various graphs of pressure change over distance of an example 100 km test pipe having a closed end and a leak at 60 km along the line.

In this connection, FIG. 3(a) shows the pressure variation over distance for pressures $P_1$ and $P_2$ where the pipeline is flat and the leak vents into ambient air. It can be seen that this graph corresponds to FIG. 1.

FIG. 3(b) shows the results for a similar pipeline, but in this case the pipeline is subjected to changes in physical height (altitude), resulting in changes in static pressure. As can be seen, the plots for $P_1$ and $P_2$ follow a similar pattern to that shown in FIG. 3(a), however the changes in static pressure cause variations in the pressure within the pipeline. Nevertheless, since the change in physical height of the pipeline is known and the above expression accounts for this, this effect can be accounted for and the location of the leak can be identified.

FIG. 4(a) shows the effect of the pipeline being at sub-sea. As can be seen, as the topography of the seabed changes, there are changes in the static head of the internal liquid (liquid in the pipe) and the external liquid (sea water). This results in a static differential between the liquid pipeline and the surrounding seawater, as is plotted. FIG. 4(b) shows the effect of this variation in static differential on the plots for $P_1$ and $P_2$. This is because the effect of the static differential on the plots for $P_1$ and $P_2$ is minimal. That is, the effect of seabed topography is diminished due to balance between internal and external static head, and therefore the resulting plots for $P_1$ and $P_2$ in a sub-sea pipeline closely correspond to that plotted for a pipeline venting to ambient air, like that shown in FIG. 3(a). Even so, the above expression accounts for this variation and allows the calculation of the location of the leak.

In this connection, in the case of an underwater pipeline, even though the vast majority of a pipeline may be under water, the ambient temperature at the inlet of the line, where measurements are taken, has been found to have an effect on the pressure readings taken. This is because temperature can affect the density and viscosity of some liquids. Accordingly, to mitigate this effect, testing can be carried out during periods of the day or night when the ambient temperature is at its most stable. For this reason, performing testing in the evening has been found to be particularly effective.

As will be understood, in the above examples, a close ended pipeline has been used as this allows for a simplified expression of the leak location. That is, by closing the pipe downstream of the leak, once a steady state has been achieved, all subsequent liquid flow can be attributed to the leak itself. By using this and calculations of the frictional effects on pressure drop for that flow, an estimated location of the leak can be found.

However, the present invention can also be utilised in instances where the pipeline is not closed at one end and the downstream end remains open.

Figure 5:
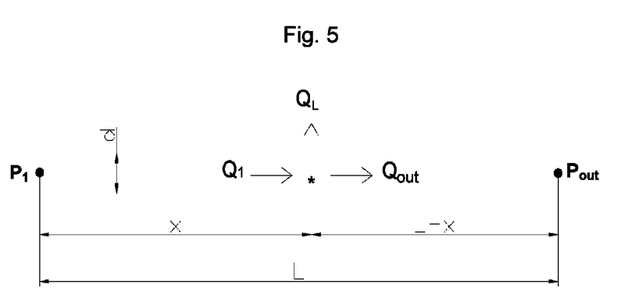
FIG. 5 shows a schematic diagram of a flow of liquid through a leaking pipeline having an open end.

In this connection, FIG. 5 shows a schematic diagram of a flow of liquid through a leaking pipeline having an open end.

Once a steady state has been reached, for a given pressure $P_1$ there will be an associated flow $Q_1$. The pressure will drop due to frictional effects from value $P_1$ at the upstream end, to the value $P_{out}$ at the downstream end. In this example the downstream end is the outlet of the pipeline. At position X along the length of the pipeline L there is a flow $Q_L$ from the leak, as well as flow $Q_{out}$ in the pipeline downstream of the leak. Accordingly, once a steady state has been achieved, all subsequent liquid flow can be attributed to the leak $Q_L$ and the downstream flow $Q_{out}$. As such, if the downstream pressure and flow rate is measured, in addition to the inlet pressure and flow rate, the flow attributed to the leak $Q_L$ can be estimated. This, with calculations of the frictional effects on pressure drop, can be used to estimate the location of the leak. The derivation of the expression for an open ended pipeline is discussed below.

The continuity equations states:

$$Q_1 = Q_{out} + Q_L \Rightarrow Q_{out} = Q_1 - Q_L \quad \text{Equation 9}$$

$$V_{out} \cdot A_{out} = V_1 \cdot A_1 - Q_L$$

$$A_{out} = A_1 = A_* = A$$

$$\Rightarrow V_{out} = V_1 - \frac{Q_L}{A}$$

Where
- $Q_1$ is the flow at the inlet;
- $Q_{out}$ is the flow at the outlet;
- $Q_L$ is the flow at the leak;
- $V_1$ is the velocity at the inlet;
- $V_{out}$ is the velocity at the outlet; and
- A is the area of the pipeline (i.e. same area at the inlet $A_1$, leak site $A_*$ and outlet $A_{out}$).

The Orifice Equation states:

$$Q_L = C_d A_L \sqrt{\frac{2\Delta P}{\rho}} \Rightarrow Q_L = C_d \cdot A_L \sqrt{2 \cdot g \cdot \left(\frac{P_{in}}{\rho \cdot g} - \frac{P_{ext}}{\rho \cdot g}\right)} \quad \text{Equation 10}$$

Where
- $Q_l$ is the flow through the leak;
- $\rho$ is the density of the liquid in the pipeline;
- $C_d$ is the coefficient of discharge;
- $A_L$ is the area of the leak;
- $\Delta P$ is the pressure differential at the leak site;
- $P_{in}$ is the pressure inside the pipeline at the leak;
- $P_{ext}$ is the external pressure outside the pipeline at the leak; and
- g is acceleration due to gravity.

Combing equations 9 and 10 results in:

$$V_{out} = V_1 - C_d \cdot \frac{A_L}{A} \sqrt{\frac{2}{\rho} \cdot (P_{in} - P_{ext})} \quad \text{Equation 11}$$

As above, Bernoulli's Equation can then be used to calculate the internal pressure at the leak location based on the liquid energy loss between the inlet and the leak:

$$H_1 + \frac{V_1^2}{2 \cdot g} = H_* + \frac{V_*^2}{2 \cdot g} + \Delta H_{1 \to *} \quad \text{Equation 12}$$

$$H = z + \frac{P}{\rho \cdot g} \text{ (in general)}$$

$$\Rightarrow \frac{P_1}{\rho \cdot g} + \frac{V_1^2}{2 \cdot g} + Z_1 = \frac{P_{in}}{\rho \cdot g} + \frac{V_*^2}{2 \cdot g} + Z_* + \Delta H_{1 \to *}$$

$$\Rightarrow P_{in} = P_1 + g \cdot \rho \cdot (z_1 - z_*) - g \cdot \rho \cdot \Delta H_{1 \to *}$$

Where
- $Z_1$ is the static head at the inlet;
- $Z_*$ is the static head at the leak;
- $V_1$ is the liquid velocity at the inlet;
- $V_*$ is the liquid velocity at the leak;
- $\rho$ is the liquid density;
- g is gravitational acceleration; and
- $\Delta H_{1 \to *}$ is liquid energy loss between the inlet and the leak.

As above, the $\Delta H_{1 \to *}$ losses in this example can be attributed to friction and can be estimated using the D'Arcy Weisbach relationship as shown in Equation 13:

$$\Delta H_{1 \to *} = \lambda \left(\frac{x}{d}\right)\left(\frac{V_1^2}{2 \cdot g}\right) \quad \text{Equation 13}$$

Where
- x is the length of the pipeline between the inlet to the leak (leak location);
- d is the diameter of the pipeline;
- V is the average velocity;
- g is gravitational acceleration; and
- $\lambda$ is the friction factor along the pipeline:
  In laminar situations:

$$\lambda = \frac{64}{Re}$$

In turbulent flow situations:

$$\frac{1}{\sqrt{\lambda}} = -2 \log_{10}\left[\frac{\varepsilon/D_h}{3.7} + \frac{2.51}{Re\sqrt{\lambda}}\right]$$

where Re is the Reynolds Number.
Substituting equation 12 into equation 11 gives:

$$V_{out} = V_1 - \cfrac{1}{C_d \cdot \cfrac{A_L}{A} \sqrt{\cfrac{2}{\rho} \cdot (P_1 + g \cdot \rho \cdot (z_1 - z_*) - g \cdot \rho \cdot \Delta H_{1 \to *} - P_{ext})}} \quad \text{Equation 14}$$

Bernoulli's Equation can then be used to estimate the internal pressure at the leak location to the liquid energy loss between the inlet and the outlet:

$$H_1 + \frac{V_1^2}{2 \cdot g} = H_{out} + \frac{V_{out}^2}{2 \cdot g} + \Delta H_{1 \to out} \quad \text{Equation 15}$$

-continued $$H = z + \frac{P}{\rho \cdot g} \quad \text{(in general)}$$

$$\Rightarrow \frac{P_1}{\rho \cdot g} + \frac{V_1^2}{2 \cdot g} + z_1 = \frac{P_{out}}{\rho \cdot g} + \frac{V_{out}^2}{2 \cdot g} + z_{out} + \Delta H_{1 \to out}$$

$$\Rightarrow 2 \cdot g \cdot \left[ \frac{P_1}{\rho \cdot g} - \frac{P_{out}}{\rho \cdot g} + z_1 - z_{out} + \frac{V_1^2}{2 \cdot g} - \Delta H_{1 \to out} \right] = V_{out}^2$$

Where
$Z_1$ is the static head at the inlet;
$Z_{out}$ is the static head at the outlet;
$V_1$ is the liquid velocity at the inlet
$V_{out}$ is the liquid velocity at the outlet;
$\rho$ is the liquid density;
g is gravitational acceleration; and
$\Delta H_{1\text{-}out}$ is liquid energy loss between the inlet and the outlet.

Again, the Weisbach relationship can be used to calculate the $\Delta H_{1\text{-}out}$ losses attributed to friction:

$$\Delta H_{1 \to out} = \lambda \left( \frac{x}{d} \right) \left( \frac{V_1^2}{2 \cdot g} \right) + \lambda \left( \frac{(L-x)}{d} \right) \left( \frac{V_{out}^2}{2 \cdot g} \right) \quad \text{Equation 16}$$

Substituting equation 15 into equation 14 then gives:

$$2 \cdot g \left[ \frac{P_1}{\rho \cdot g} - \frac{P_{out}}{\rho \cdot g} + z_1 - z_{out} + \frac{V_1^2}{2 \cdot g} - \Delta H_{1 \to out} \right] == \quad \text{Equation 17}$$
$$\left( V_1 - C_d \cdot \frac{A_L}{A} \sqrt{\frac{2}{\rho} \cdot \left( \frac{P_1 + g \cdot \rho \cdot (z_1 - z_*) - }{\rho \cdot g \cdot \Delta H_{1 \to *} - P_{ext}} \right)} \right)^2$$

From equation 17, N is defined as:

$$N = 2 \cdot g \left[ \frac{P_1}{\rho \cdot g} - \frac{P_{out}}{\rho \cdot g} + z_1 - z_{out} + \frac{V_1^2}{2 \cdot g} - \Delta H_{1 \to out} \right] \quad \text{Equation 18}$$

Further, M is defined as:

$$M = C_d \cdot \frac{1}{A} \sqrt{\frac{2}{\rho} \cdot (P_1 + g \cdot \rho \cdot (z_1 - z_*) - g \cdot \rho \cdot \Delta H_{1 \to *} - P_{ext})} \quad \text{Equation 19}$$

Finally, the area of the leak can be calculated through the following equation:

$$N = (V_1 - A_L \cdot M)^2 \Rightarrow \pm \sqrt{N} = V_1 - A_L \cdot M \quad \text{Equation 20}$$
$$\Rightarrow A_L = \frac{1}{M} \cdot \left( V_1 \mp \sqrt{N} \right)$$

As will be understood from the above, in a steady state situation, the flow at the leak is equal to the flow at the inlet minus the flow at the outlet. Therefore the above provides an expression in terms of the pressure at the inlet $P_1$, pressure at the outlet $P_{out}$ and external pressure at the leak $P_{ext}$, relative to the leak area $A_L$ and leak location X. The leak location X is considered in equation 16 associated with the energy losses due to friction along the line, which in tern is used to calculate M.

In use, the testing apparatus for testing an open ended pipeline is similar to that shown in FIG. 2 however, in this case, it is necessary to include a further flow sensor 2 and pressure sensor 3 at the downstream outlet end of the pipeline for measuring the downstream pressure, flow rate and liquid velocity.

Using this apparatus, the pressure at the inlet $P_1$ and the outlet $P_{out}$ can be measured. The velocity at the inlet $V_1$ and outlet $V_{out}$ can also be measured. The diameter of the pipeline d is known from the pipeline specifications. Gravitational acceleration g is known. The friction factor $\lambda$ can be calculated from the equations listed above. The length of the pipeline is known from the pipeline specifications. The coefficient of discharge $C_d$ can be determined as a function of Reynolds Number. The density of the liquid in the pipeline $\rho$ is known from the type of liquid being used. In the case of a sub-sea pipeline, the density of seawater $\rho$ is known and depth D can be estimated from topographical information for the pipeline. The static head at the inlet $z_1$ and outlet $z_{out}$ can be calculated from the pressure measurements. The velocity V can be measured at the inlet and outlet. Accordingly, this data provides the information to complete the above expression of flow for pressure $P_1$ at the inlet and outlet $P_{out}$, with the unknowns of the leak area $A_L$ and leak location x. Therefore, by taking a second set of measurements at a different pressure $P_2$, the expression can be solved simultaneously to derive estimated values for the leak location x and the leak area $A_L$.

Figure 6A:
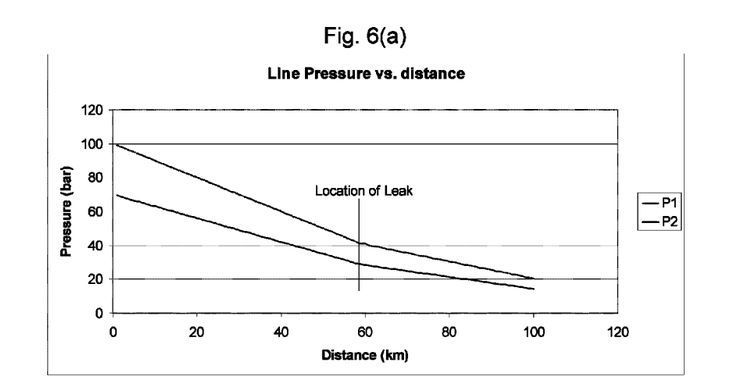
Figure 6B:
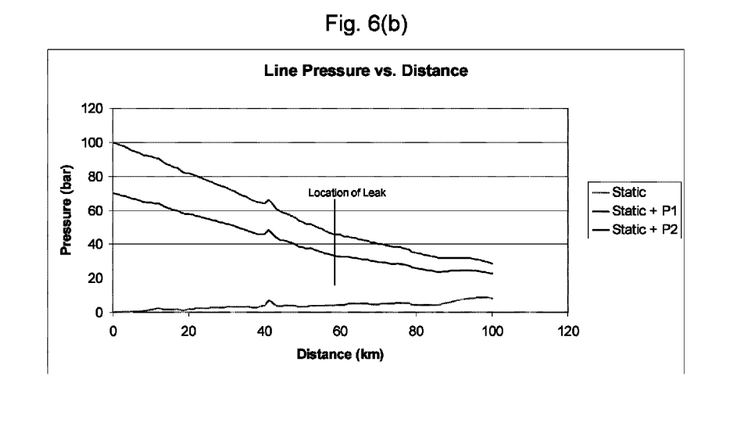
Figure 6C:
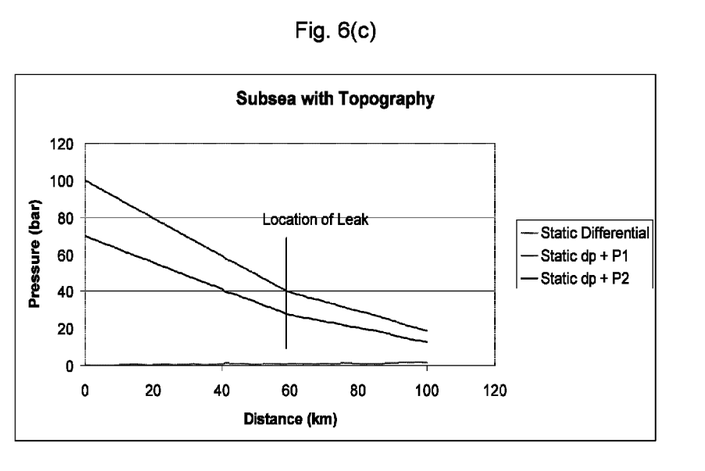

In this connection, FIGS. 6(a)-(c) shows various graphs of pressure change over distance in a 100 km test pipe having an open end and a leak at 60 km along the line.

FIG. 6(a) shows a graph of the pressure variation over distance of pressures $P_1$ and $P_2$ in an example leaking pipeline having an open end when where the pipeline is flat and vents into ambient air. As can be seen, this graph displays similar characteristics to that described above in reference to FIGS. 1 and 3(a), with the location of the leak causing an alteration in the gradient of the pressure profile over distance. However, in this case, the pressure continues to drop after the leak location which corresponds to flow $Q_{out}$. Accordingly, in the case of an open ended pipeline, the frictional effects of this drop in pressure after the leak location up until the end of the pipeline are also accounted for in the above described expression.

FIG. 6(b) shows the results for a similar pipeline, but in this case the pipeline is subjected to changes in physical height (altitude), resulting in changes in static pressure. As can be seen, the plots for $P_1$ and $P_2$ follow a similar pattern to that shown in FIG. 6(a), however the changes in static pressure cause variations in the pressure within the pipeline. Nevertheless, since the change in physical height of the pipeline is known, and the above expression accounts for this, this effect can be cancelled out and the location of the leak can be identified.

FIG. 6(c) shows the effect of the pipeline being sub-sea. Changes in seabed topography result in changes in the static head of the internal liquid (liquid in the pipe) and the external liquid (sea water). This creates a static differential between the liquid pipeline and the surrounding sea water. However, as can be seen, the effect of the static differential on the plots for $P_1$ and $P_2$ is minimal since the internal and external static head partially counteract each other. As such, the resulting plots for $P_1$ and $P_2$ in a sub-sea pipeline closely correspond to that plotted for a pipeline venting to ambient air, like that shown in FIG. 6(a). Again, the above expression accounts for this variation and allows the calculation of the location of the leak.

Accordingly, the present invention allows the location of a leak in a pipeline to be estimated. Once the location of the leak has been estimated, the pipe may be inspected in this region to determine the precise location of the leak and allow for subsequent repair. During testing conducted on a 120 Km sub-sea umbilical pipeline, the present inventors have found leak location accuracy results within +/−6 km. This can significantly reduce the distance over which the pipeline needs to be manually searched, saving time and expense. Furthermore, the present invention provides an indication of the size (area) of the leak, which is useful in providing information as to what type of maintenance may be necessary. For example, if the results indicate a relatively small leak, an operator may decide that this can be repaired by a maintenance team filling the leak. Conversely, a very large leak may indicate that more substantive repairs will be necessary.

It will be understood that the illustrated embodiments described herein show applications of the invention only for the purposes of illustration. In practice the invention may be applied to many different configurations, the detailed embodiments being straightforward to those skilled in the art to implement.

The invention claimed is:

1. A method for estimating a location of a leak in a pipeline, the method comprising the steps of:
   A) feeding a liquid of a known density into said pipeline at a first inlet pressure and shutting said pipeline downstream of said leak, such that, once said liquid achieves a substantially steady flow rate, the flow rate of liquid passing into the pipeline can be assumed to be equal to the flow of liquid from the leak;
   B) when said liquid achieves a substantially steady flow rate at said first pressure, recording the flow rate of the liquid passing into the pipeline;
   C) repeating steps A and B at a second, different, inlet pressure; and
   D) calculating, using a computer, an estimate of the leak location and the area of the leak by simultaneously solving a first and a second expression of the leak location relative to the flow rate recorded for each of said first and second inlet pressures, wherein at least one of said first and second expressions is represented by:

$$Q_L = C_d A_L \sqrt{2g\left[\frac{P_1}{\rho_m g} + \left(\frac{\rho_m - \rho_w}{\rho_m}\right)D - \lambda\left(\frac{x}{d}\right)\left(\frac{V^2}{2g}\right)\right]}$$

where
$Q_L$ is the flow of liquid through the pipeline measured at the inlet;
$C_d$ is the coefficient of discharge;
$A_L$ is the area of the leak;
g is gravitational acceleration;
$P_1$ is the pressure at the pipeline inlet;
$\rho_m$ is the liquid density in pipeline;
$\rho_w$ is the density of seawater;
D is the depth beneath the sea at the leak location;
$\lambda$ is the friction factor along the line;
x is the leak location;
d is the pipeline diameter;
V is the liquid velocity, and
wherein said first and second expressions comprise estimating the leak location and the area of the leak based on frictional energy losses of said liquid travelling through the pipeline to the leak location and relating this to the pressure in the pipeline at the leak and the flow rate of liquid from said leak.

2. A method according to claim 1 wherein at least one of said expressions applies the D'Arcy Weisbach relationship for estimating said frictional energy losses.

3. A method according to claim 1 wherein at least one of said expressions applies Bernoulli's Equation for relating frictional energy losses to the pressure in the pipeline at the leak.

4. A method according to claim 1 wherein at least one of said expressions applies the Orifice Flow Equation for relating the pressure in the pipeline at the leak to the flow rate.

5. A method according to claim 1 wherein at least one of said expressions further comprises accounting for external pressure at the leak location on the flow rate of liquid from said leak.

6. A method according to claim 1 wherein in said steps B and C, said liquid achieves a substantially steady flow rate when there is less than a +/−20% change in flow rate.

7. A method according to claim 1 wherein in said steps B and C, said pressure and flow rate are sampled over a period of 30 to 60 minutes and an average pressure and flow rate value is recorded.

8. A method according to claim 1 further comprising:
   repeating step C at further, different, inlet pressures;
   calculating, said computer, further estimates of the leak location using the flow rates recorded for said further inlet pressures; and
   averaging said estimates.

9. A method according to claim 1, wherein step B further comprises recording the pressure and flow rate of the liquid at a location downstream of the leak; and
   wherein at least one of said expressions accounts for the flow of liquid downstream of the leak in calculating an estimate of the leak location by deducting the effect of frictional energy losses and pressure in the pipeline of the liquid travelling from the leak location to the downstream location.

10. A method for estimating a location of a leak in a pipeline, the method comprising the steps of:
   A) feeding a liquid of a known density into said pipeline at a first inlet pressure;
   B) when said liquid achieves a substantially steady flow rate at said first pressure, recording the flow rate of the liquid passing into the pipeline and recording the pressure and flow rate of the liquid at a location downstream of the leak;
   C) repeating steps A and B at a second, different, inlet pressure; and
   D) calculating, using a computer, an estimate of the leak location and the area of the leak by simultaneously solving a first and a second expression of the leak location relative to the flow rate recorded for each of said first and second inlet pressures, wherein at least one of said expressions is represented by:

$$A_L = \frac{1}{M} \cdot \left(V_1 \mp \sqrt{N}\right)$$

where $$N = 2 \cdot g\left[\frac{P_1}{\rho \cdot g} - \frac{P_{out}}{\rho \cdot g} + z_1 - z_{out} + \frac{V_1^2}{2 \cdot g} - \Delta H_{1 \to out}\right]$$

$$M = C_d \cdot \frac{1}{A}\sqrt{\frac{2}{\rho} \cdot (P_1 + g \cdot \rho \cdot (z_1 - z_*) - g \cdot \rho \cdot \Delta H_{1 \to *} - P_{ext})}$$

-continued $$\Delta H_{1 \to *} = \lambda \left(\frac{x}{d}\right)\left(\frac{V_1^2}{2 \cdot g}\right)$$

$$\Delta H_{1 \to out} = \lambda \left(\frac{x}{d}\right)\left(\frac{V_1^2}{2 \cdot g}\right) + \lambda \left(\frac{(L-x)}{d}\right)\left(\frac{V_{out}^2}{2 \cdot g}\right)$$

$A_L$ is the area of the leak;
$V_1$ is the inlet liquid velocity;
$V_{out}$ is the liquid velocity at the downstream location;
g is gravitational acceleration;
$P_1$ is the pressure at the pipeline inlet;
$P_{out}$ is the pressure at the downstream location;
$\rho$ is the liquid density in pipeline;
$Z_1$ is the static head at the inlet;
$Z_{out}$ is the static head at the downstream location;
$Z_*$ is the static head at the leak location;
$\Delta H_{1-*}$ is liquid energy loss between the inlet and the leak location;
$\Delta H_{1-out}$ is liquid energy loss between the inlet and the outlet;
$C_d$ is the coefficient of discharge;
A is the cross sectional area of the pipeline;
$P_{ext}$ is the external pressure at the leak location;
x is the leak location;
L is the length of the pipeline between the inlet and the downstream location;
d is the pipeline diameter; and
$\lambda$ is the friction factor along the line, and
wherein at least one of said expressions accounts for the flow of liquid downstream of the leak in calculating an estimate of the leak location by deducting the effect of frictional energy losses and pressure in the pipeline of the liquid travelling from the leak location to the downstream location.

* * * * *